United States Patent [19]

Wilson

[11] Patent Number: 4,933,117
[45] Date of Patent: Jun. 12, 1990

[54] WATER DISTRIBUTION SYSTEM FOR AN EVAPORATIVE COOLER

[75] Inventor: M. Cecil Wilson, Denison, Tex.

[73] Assignee: Champion Cooler Corporation, Denison, Tex.

[21] Appl. No.: 370,505

[22] Filed: Jun. 23, 1989

[51] Int. Cl.⁵ .............................................. B01F 3/04
[52] U.S. Cl. ...................................... 261/99; 261/29; 261/106; 261/107
[58] Field of Search .................. 261/107, 106, 104, 29, 261/99

[56] References Cited

U.S. PATENT DOCUMENTS

| | | | |
|---|---|---|---|
| 2,031,055 | 2/1936 | McKinney | 261/104 |
| 2,271,342 | 1/1942 | Korts | 261/29 |
| 2,497,947 | 2/1950 | Lewis | 261/106 |
| 2,702,460 | 2/1955 | Gaugler | 261/104 |
| 2,947,452 | 8/1960 | Frohmader et al. | 261/106 |
| 3,075,750 | 1/1963 | Goettl | 261/DIG. 41 |
| 3,231,490 | 1/1966 | Fry | 261/112.1 |
| 4,031,180 | 6/1977 | Bohanon | 261/106 |
| 4,347,197 | 8/1982 | Cox | 261/106 |
| 4,499,031 | 2/1985 | Sexton et al. | 261/DIG. 3 |
| 4,602,487 | 7/1986 | Seeley | 261/106 |

Primary Examiner—Tim Miles
Attorney, Agent, or Firm—Berman, Aisenberg & Platt

[57] ABSTRACT

An evaporative cooler of the invention includes a water distribution system having a dispersion cover spaced from a water pipe having evenly spaced orifices therein for expelling water. The water impinges on a flock-coated concave surface of the dispersion cover. The flock coating retards the water flow and spreads the water flowing downwardly so that the water substantially evenly covers a drip rail at the lower edge of the flock-coated surface adjacent the evaporative medium in the cooler.

15 Claims, 2 Drawing Sheets

WATER DISTRIBUTION SYSTEM FOR AN EVAPORATIVE COOLER

FIELD OF THE INVENTION

The invention relates to a water distribution system for air conditioners and other evaporative coolers.

BACKGROUND OF THE INVENTION

Evaporative coolers use the principle of heat absorption by water evaporation to cool outside air and deliver the cooled air to an enclosed space to be cooled. In a known basic evaporative cooler of this kind, the evaporative medium is supported on the intake side of a cabinet. The evaporative medium is a partially open absorbent material which is wetted with water from a recirculating pump mounted in a water catch basin below the medium. The blower moves dry hot outside air through the opening of the wetted evaporative medium, causing evaporation of the water and cooling of the air. The cooled air is directed into the space to be cooled. The cooling efficiency of the evaporative cooler is directly related to the evaporative efficiency of the medium and is also related to the even dispersion of water to the medium.

The patent to Sexton, U.S. Pat. No. 4,499,031, describes an evaporative cooler water distribution system. The water distributed is deflected by a U-shaped channel and falls downwardly. U.S. Pat. No. 4,379,712, to Sperr, Jr. shows a similar structure having an arcuate cross-section in which the water is deflected downwardly by a curved surface. Bohanon, U.S. Pat. No. 4,031,180, shows a structure in which water is sprayed upwardly to impinge on a box-shaped deflector. The patent to Oplatka, U.S. Pat. No. 3,743,256, shows water being sprayed downwardly onto a vertical wall and impinging on a patterned splash plate to cover the wall with water. Blatter, U.S. Pat. No. 4,351,781, also describes water distributed over a terraced surface. Goettl U.S. Pat. No. 4,080,410, describes an evaporative cooler system in which the water flows downwardly.

SUMMARY OF THE INVENTION

In an evaporative water cooler of the invention, water is directed toward an elongate lineal-concave dispersion cover having a flock-coated inner surface. Jets of water are forced through evenly spaced orifices in a water distribution pipe and the jets of water impinge on the inner surface of the curved dispersion cover. The flock-coating on the inner surface allows even distribution of the water which flows down the curved side of the elongated dispersion cover to uniformly cover a drip rail edge before entering the evaporative medium.

It is an object of the invention to provide a flock-coated dispersion cover for evenly distributing water in an evaporative cooler water distribution system.

DETAILED DESCRIPTION OF THE INVENTION

The present invention concerns apparatus for evenly dispersing water to an evaporative medium in an evaporative cooler water distribution system. An elongate lineal-concave dispersion cover is mounted over a water delivery pipe having equally spaced impingement orifices. Water is delivered through the orifices to impinge on the underside of the dispersion cover. The water then flows down the concave surface of the dispersion cover in a substantially even film of water to a drip rail or edge, from which it enters the evaporative medium.

Impingement alone does not distribute the circulated water evenly to the evaporative medium. Evaporative cooler recirculating pumps in use at present do not produce high enough head pressures to allow impingement spreading alone to function well. According to the present invention, the inner surface of the dispersion cover is modified by application of a flock coating to enable even distribution of water to the evaporative medium for ultimate cooling efficiency, using low head pressure recirculating pumps, known in the art. The flock coating impedes the flow of water by slowing the water flow to allow the water to be evenly spread over the concave surface as it runs down the concave surface to the drip rail. The water flow down the concave surface substantially covers the length of the drip rail.

Figure 1:
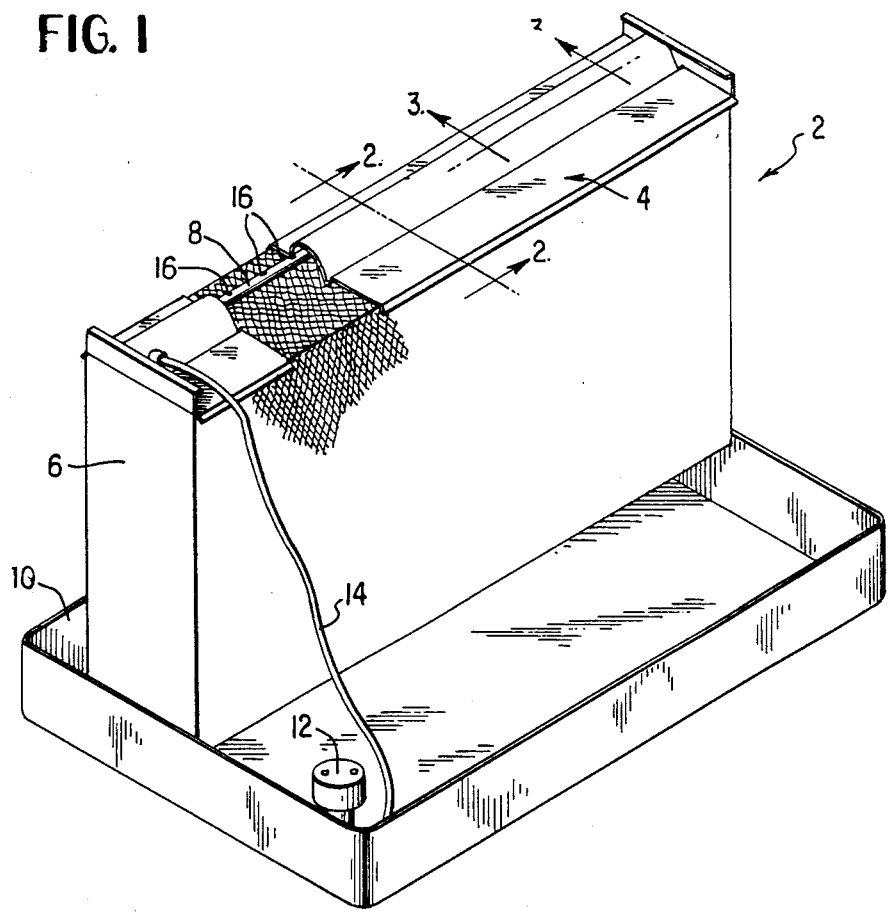
FIG. 1 is a perspective view, partly cut away, of an evaporative water system of the invention.

With reference to the Figures, in which like numbers represent like parts, FIG. 1 illustrates a lineal-concave dispersion cover upon which the water impinges before falling into the evaporative medium in the evaporative cooler. Apparatus 2, shown in FIG. 1, includes lineal-concave dispersion cover 4 mounted directly above the evaporative medium 6. Water supply pipe 8 is supported below dispersion cover 4 so as to cause maximum impingement according to the water supply head pressure. Evaporative medium 6 is mounted below dispersion cover 4, directly above water catch basin 10, to allow water not evaporated by the time it reaches the bottom of evaporative medium 6, to drip into catch basin 10. Recirculating pump 12 pumps water from catch basin 10 through delivery pipe 14 back to water supply pipe 8 for recirculation. The water circulation system is mounted at the intake side of the evaporative cooler so that air moved by the blower passes through evaporative medium 6.

Water supply pipe 8 has spaced orifices 16 for distributing water. Orifices 16 are preferably evenly spaced from each other.

Figure 2:
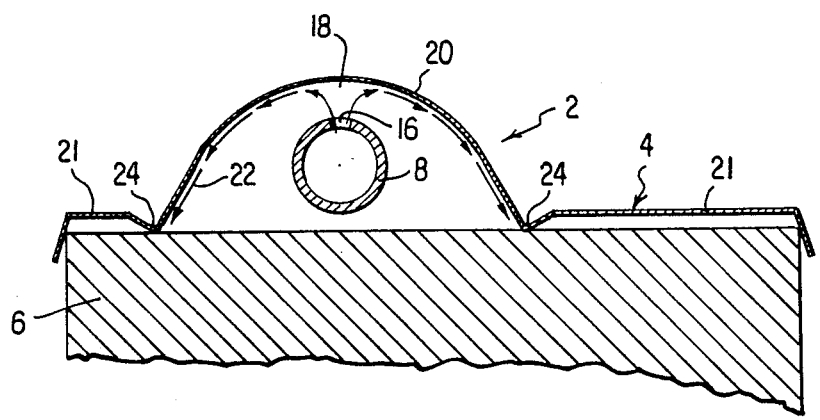
FIG. 2 is a cross-sectional view taken on line 2—2 of FIG. 1.
Figure 3A:
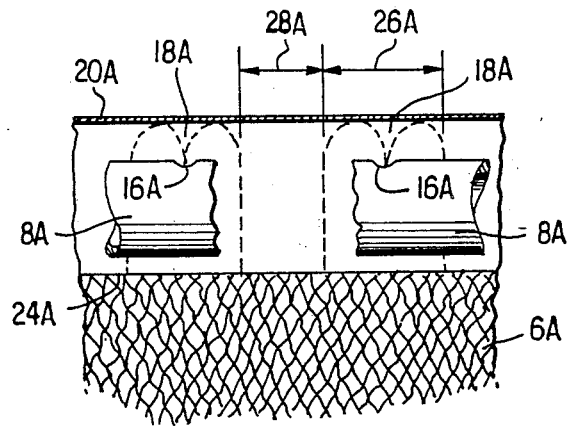
FIGS. 3A (prior art) and 3B (invention) ar cross-sectional views, partly cut-away, taken on line 3—3 of FIG. 1.
Figure 3B:
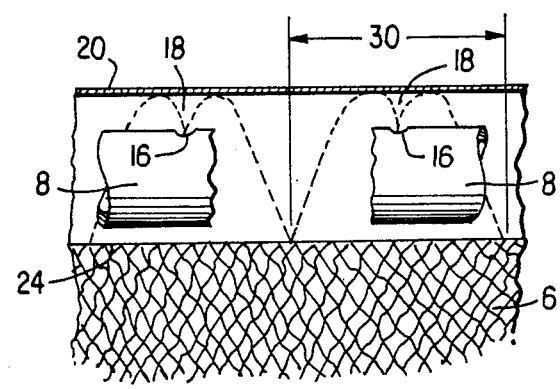
Figure 4:
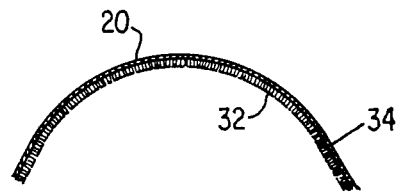
FIG. 4 is a detail of FIG. 1, showing flock-coating on the underside of the dispersion cover.

The lineal-concave dispersion cover used to distribute water to the evaporative medium is shown in detail in FIGS. 2 to 4. With reference to FIG. 2, water is circulated to water supply pipe 8 by recirculating pump 12, shown in FIG. 1, at a given head pressure. The head pressure inside water supply pipe 8 causes the water to be forced through the equally spaced orifices 16 toward impingement point 18 on concave portion 20 of dispersion cover 4. Impingement point 18 is generally at the uppermost point of concave portion 20 of dispersion plate 4. Impingement action causes the water to spread along the underside of concave portion 20, in all directions. However, because of the low head pressure used, water spread along the longitudinal axis of a concave surface is soon overcome by gravitational force and follows the trajectory shown by the arrows on line 22, down the underside of dispersion cover 20 to a drip rail 24 formed as the lower edge of elongate dispersion cover 4 between concave portion 20 and lineal portion 21. Dispersion cover 4 is mounted above the evaporative medium 6 in such a manner that drip rail 24 is preferably in contact with evaporative medium 6 so that water reaching drip rail 24 will move by gravitational force into the body of evaporative medium 6 due to the absorbency of the evaporative medium.

With reference to FIGS. 3A and 3B, the functional operating features of the flock-coated lineal-concave dispersion cover of the invention (FIG. 3B) are compared with a prior art system (FIG. 3A). With reference to FIG. 3A, prior art lineal-concave dispersion cover 20A is positioned around water supply pipe 8A. Water from the catch basin is moved by a recirculating pump into water supply pipe 8A at a given head pressure. The head pressure inside water supply pipe 8A causes the water to be forced out of equally spaced orifices 16A toward impingement point 18A on the underside of lineal-concave dispersion cover 20A. Impingement action causes the water to spread along the underside of dispersion plate 20A in all directions. However, because of the low head pressure of the water impinging on cover 20A and the gravitational force exerted on this water, the water only spreads a short distance 26A along the longitudinal axis of the water pipe. Dimension 26A is considerably smaller than the spacing between orifices 16A of supply pipe 8A and results in a dry space 28A on drip rail 24A which is not supplied with a sheet of water for entering evaporative medium 6A. Due to the deficiencies of this prior art apparatus, an excessive amount of water is delivered to the evaporative medium within the confines of dimension 26A and no water is delivered to the evaporative medium within the confines of dimension 28A. This results in reduced evaporative efficiency and, therefore, in reduced cooling efficiency.

Referring now to FIG. 3A which illustrates the improved function of a flock-coated lineal-concave dispersion cover 20 of the invention, the underside of lineal-concave dispersion cover 4 is flock-coated. Flock coating of concave portion 20 increases the area covered by the water impinging thereon by causing impingement water to spread further along the longitudinal axis of concave portion 20 as it flows down the trajectory represented by line 22 shown in FIG. 2 to drip rail 24. Flock coating results in an even film of water being supplied to drip rail 24 along a dimension represented by line 30. Dimensional line 30 is equivalent to the spacing between adjacent orifices 16 and results in the even distribution of a water film to the entire drip rail and thus to the evaporative medium. Dry spaces on drip rail 24 do not occur. In a non-limiting example, the evaporative medium is formed of fluted cellulose paper. Drip rail 24 contacts the peaks of the flutes and water leaving drip rail 24 is directly absorbed by the evaporative medium. In intermediate portions between the peaks, water may drip from drip rail 24 into the evaporative medium.

The modification caused by flock-coating at least concave portion 20 of lineal concave dispersion cover 4 is shown in FIG. 4. A dense flock coating 32 of short synthetic or natural fibers is applied to underside 34 of at least the concave portion of the lineal-concave dispersion cover 4. This causes the necessary impediment to flow and supplies a water film evenly to the entire length of each drip rail of a lineal-concave dispersion cover. The underside of the entire lineal-concave dispersion cover may equally well be flock coated. The material used for the flock is preferably synthetic fibers such as acrylic or nylon fibers. Other materials will be apparent to one skilled in the art.

The individual fibers of the flock preferably have a cross-section of about 2 to 4 denier and a length of about 1 to 2 millimeters. The flock is applied to the underside of the lineal-concave dispersion cover at a density of about 125,000 to 175,000 fibers/sq. in., using a flexible, waterproof polyurethane flock adhesive, such as FLOCK-LOK 851, manufactured by Lord Corporation of Erie, Pa. The adhesive is applied by conventional methods such as dipping, spraying, roll coating or curtain coating. Spraying is preferred. For most applications, a wet adhesive film thickness of about 8 mils is suggested. The adhesive is allowed to stand for 5 to 50 seconds before application of the flock.

The flock is applied by electrostatic coating at about 60,000 to 80,000 volts using a charged spray gun which is moved across the part to be coated. The flock particles are thus electrostatically charged with a high voltage which axially aligns the fibers as they approach the grounded dispersion cover. Although only the concave under surface 20 of the dispersion cover 4 needs to be flock-coated, the entire undersurface, including lineal portions 21, may be coated, for convenience.

The dispersion cover may be formed from 22 gauge hot-dipped (G-90) galvanized steel for corrosion resistance. The surface is cleaned with hot sprayed soap solution and alkali and then rinsed, thus removing oils. In order to achieve optimum coating life, the surface is then coated with 0.1 mil thickness of zinc phosphate, and rinsed again. The surface is pacified by acid treatment which reduces the peaks and valleys in the galvanized coating to improve the paint adhesion and to reduce the likelihood of setting up electronic cells under the coating. The surface is coated with about 1.5 mils thickness of baked-on, high solids polyester paint coating, and cured at 380 –400 degrees F. for 10 minutes in a baking oven.

The surface to be flocked is coated with a film of urethane adhesive and the flock is applied using the electrostatic process described above. Alternatively, acrylic or epoxy adhesives may be used. The relative humidity and temperature are controlled during application of the flock, and the finished flocked part is heat cured before use. The electric charge, applied to the flock electrostatically, orients the flock fibers with the longitudinal axis perpendicular to the substrate surface.

In an alternative embodiment, the dispersion cover may be made from plastic. In a non-limiting example, ABS (acrylonitrile-butadiene-styrene copolymer), which is flock coated to function as herein described, is used.

The water pipe is made from standard ½ inch PVC pipe. The orifices are, in a non-limiting example, 0.12 to 0.16 inches in diameter, preferably about 0.14 inches in diameter, and are substantially evenly spaced at intervals of about 2.5 to 3.5 inches, preferably at intervals of about 3 inches, from each other. The shape of the dispersion cover and the spacing between the pipe and the dispersion cover are designed for the best dispersion of water with consideration given to the head pressure of the supply. Head pressure, in non-limiting example, may be 2–4 ft. head at the point of delivery.

According to invention, water dispersed from the orifices of the water supply pipe onto the flock coated surface of the dispersion cover flows down the flock coated surface so that the drip rail is evenly covered with a film of water, as shown in FIG. 3B. This enables the evaporative medium to be evenly wetted with water. The water is evaporated as air to be cooled is pulled through the evaporative medium by the blower. Capillary action of the fibers, which retards the flow speed, causes the water to spread. Dry areas of the drip rail are eliminated.

Another method of achieving the same result is to line the concave portion of the dispersion cover with a woven or non-woven textile fabric or cloth, secured with adhesive, to slow the flow of water and spread it longitudinally so that the drip rail is evenly spread with water and dry areas are eliminated. The fibers of the woven or non-woven cloth act similarly to flock fibers in retarding water flow, allowing spreading.

While the invention has been described above with respect to certain embodiments thereof, variations and modifications may be made without departing from the spirit and scope of the invention.

What is claimed is:

1. A dispersion cover for a fluid distribution system in an evaporative cooler comprising flock-coated surface means for distributing fluid impinging thereon, wherein the flock coating comprises flock fibers secured to the surface means substantially perpendicularly thereto.

2. A dispersion cover according to claim 1 wherein the flock coating comprises natural fibers.

3. A dispersion cover according to claim 1 wherein the flock coating comprises synthetic fibers.

4. A dispersion cover according to claim 3 wherein the synthetic fibers comprise acrylic fibers.

5. A dispersion cover according to claim 3 wherein the synthetic fibers comprise nylon fibers.

6. A dispersion cover according to claim 1 wherein the flock-coating comprises fibers of about 2 to 4 denier in cross-section.

7. A dispersion cover according to claim 1 wherein the flock-coating comprises fibers of about 1.0 to 2.0 mm. in length.

8. A dispersion cover according to claim 1 wherein the flock-coating comprises an adhesively secured flock-coating of synthetic fibers of about 2 to 4 denier in cross-section and 1 to 2 mm. in length.

9. A dispersion cover according to claim 1 wherein the flock fibers are adhesively secured to the surface means.

10. A dispersion cover for a fluid distribution system in an evaporative cooler, said dispersion cooler comprising an elongated concave undersurface and an elongated drip rail extending along a lower edge thereof, said undersurface comprising flock-coated surface means for dispersing water impinging thereon, whereby said water spreads over said undersurface and contacts said elongated drip rail substantially along its length.

11. An evaporative cooler comprising a water distribution system which comprises a dispersion cover including fiber-coated concave surface means for spreading water impinging thereon, and an elongated drip rail extending along a lower edge thereof, whereby said water spreads over said surface means and flows downwardly to contact said drip rail substantially along the length thereof.

12. An evaporative cooler according to claim 11 wherein said fiber-coating on the surface means comprises flock fibers adhesively secured substantially perpendicularly to the surface means at a density of about 125,000 to 175,000 fibers/sq.in.

13. An evaporative cooler according to claim 12 wherein the flock fibers have a cross-section of about 2 to 4 denier and a length of about 1 to 2 mm.

14. An evaporative cooler of claim 11 further comprising a water pipe having orifices substantially evenly spaced therein, secured to said dispersion cover wherein the water impinging on the surface means flows from said orifices.

15. An evaporative cooler of claim 14 wherein the orifices have a diameter of about 0.12 to 0.16 inches and are spaced about 2.5 to 3.5 inches apart.

* * * * *